(12) United States Patent
Fukuda et al.

(10) Patent No.: US 8,700,244 B2
(45) Date of Patent: Apr. 15, 2014

(54) SYSTEM FOR PROVIDING INFORMATION ON POWER CONSUMPTION AMOUNT OF ELECTRIC VEHICLE

(75) Inventors: Yuzuru Fukuda, Urayasu (JP); Masaki Hasunuma, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/588,472

(22) Filed: Aug. 17, 2012

(65) Prior Publication Data

US 2013/0218366 A1 Aug. 22, 2013

(30) Foreign Application Priority Data

Sep. 22, 2011 (JP) ................................. 2011-207402

(51) Int. Cl.
*G05D 1/00* (2006.01)
*B60K 1/00* (2006.01)
*B60L 9/00* (2006.01)

(52) U.S. Cl.
USPC ........................................... 701/22; 180/65.1

(58) Field of Classification Search
USPC ....................................... 701/1, 22; 180/65.1
See application file for complete search history.

(56) References Cited

U.S. PATENT DOCUMENTS

| 8,229,615 | B2* | 7/2012 | Sakamoto et al. | 701/22 |
| 2009/0299558 | A1* | 12/2009 | Hidaka | 701/22 |
| 2011/0032110 | A1* | 2/2011 | Taguchi | 340/636.1 |
| 2011/0279255 | A1* | 11/2011 | Miyoshi | 340/441 |

FOREIGN PATENT DOCUMENTS

| JP | 09-119839 | 5/1997 |
| JP | 2006-115623 A | 4/2006 |

* cited by examiner

*Primary Examiner* — Thomas Black
*Assistant Examiner* — Tyler Paige
(74) *Attorney, Agent, or Firm* — Foley & Lardner LLP (57) ABSTRACT

System for providing information on power consumption amount of electric vehicle includes receiving means for receiving departure point of the electric vehicle and destination of the electric vehicle from a terminal device; a database which stores a plurality of power consumption amounts required to move between respective two sections, corresponding to combinations of two sections, the combinations including a combination of a first section in a predetermined area including the departure point and the destination, and a second section including a second point in the predetermined area; extracting means which retrieves the database to thereby extract a power consumption amount required to travel from the departure point to the destination; and transmitting means for transmitting information on the power consumption amount extracted by the extracting means to the terminal device.

7 Claims, 11 Drawing Sheets

| INDEX | No | DEPARTURE POINT MESH ID | DESTINATION MESH ID | POWER CONSUMPTION AMOUNT[Wh] |
|---|---|---|---|---|
| 1(O×PREFECTURE) | 1 | X1,Y1 | X3,Y3 | 123 |

| INDEX | No | DEPARTURE POINT MESH ID | DESTINATION MESH ID | POWER CONSUMPTION AMOUNT[Wh] |
|---|---|---|---|---|
| 1(O×PREFECTURE) | 1 | X1,Y1 | X3,Y3 | 123 |

---·--  PAST STORED DATA
        (ELECTRIC MILEAGE)
———     ROUTE TO BE SEARCHED
        THIS TIME

— ROUTE TO BE SEARCHED THIS TIME

FIG.11B

—·—· PAST STORED DATA

SYSTEM FOR PROVIDING INFORMATION ON POWER CONSUMPTION AMOUNT OF ELECTRIC VEHICLE

CROSS-REFERENCE TO RELATED PATENT APPLICATIONS

Japan Priority Application 2011-207402, filed Sep. 22, 2011 including the specification, drawings, claims and abstract, is incorporated herein by reference in its entirety.

BACKGROUND OF THE INVENTION

1. Field of the Invention

The present invention relates to a system that provides information on power consumption amount of an electric vehicle.

2. Description of the Related Art

The cruising range of an electric vehicle is as short as a fraction of that of the cruising range of a conventional gasoline-powered vehicle. There has therefore been demanded that the accurate remaining cruisable distance and remaining battery charge amount to be notified to a driver. Based on the notified remaining cruisable distance and remaining battery charge amount, the driver figures out whether the electric vehicle can travel from the present location to the destination.

The conventional gasoline-powered vehicle consumes fuel even while it is running on a downhill since the engine of the vehicle is working. In contrast, the electric vehicle is designed such that the battery mounted thereon is charged due to regeneration with braking, thereby extending the remaining cruising range of the vehicle. Thus, when the electric vehicle travels from the present location to the destination, it needs to calculate, in addition to the amount of power consumed by the battery, the amount of power charged by regeneration. Consequently, the necessity to take altitude and gradient data into consideration becomes greater than in conventional gasoline-powered vehicles.

JP-2006-115623-A discloses, for example, a technique in which histories of battery consumption are managed every link and vehicle type and such histories are downloaded from a center for accurate calculation of the cruisable distance. In addition, JP-9-119839-A discloses a technique in which, based on remaining amount of battery and data about items such as a road gradient based on information on the altitude, the presence or absence of corners, an urban area or a non-urban area, the cruisable range is to be displayed. Further in case it is determined that the vehicle cannot reach the nearest charging station judging from what is displayed, current consumption due to the air-conditioning and audio is suppressed.

SUMMARY OF THE INVENTION

According to the related art, power consumption amount data corresponding to each one of all road links from a destination to a destination is required in addition to the battery remaining capacity data in order to allow the driver to figure out whether the electric vehicle is able to reach the destination. Since many parameters associated with the gradient of each road, the number of corners, the urban area or non-urban area, etc. are processed at this time and significantly overloaded for the calculations for allowing the driver to figure out whether the electric vehicle is able to reach the destination.

In order to achieve the above object, there is provided a system for providing information on power consumption amount of an electric vehicle, according to one aspect of the present invention, which includes receiving means that receives a departure point of the electric vehicle and a destination of the electric vehicle from a terminal device; a database that stores a plurality of power consumption amounts required to move between respective two sections, corresponding to a plurality of combinations of two sections, the combinations including a combination of a first section including a first point in a predetermined area including the departure point and the destination, and a second section including a second point in the predetermined area; extracting means that retrieves the database to thereby extract a power consumption amount required for the electric vehicle to travel from the departure point to the destination; and transmitting means for transmitting information on the power consumption amount extracted by the extracting means to the terminal device.

According to the present invention, the high-speed calculation of power consumption provided to a driver to figure out whether an electric vehicle is able to reach a destination can be implemented.

BRIEF DESCRIPTION OF THE DRAWINGS

These and other features, objects and advantages of the present invention will become more apparent from the following description when taken in conjunction with the accompanying drawings wherein.

DESCRIPTION OF THE PREFERRED EMBODIMENTS

<First Embodiment>

Figure 1:
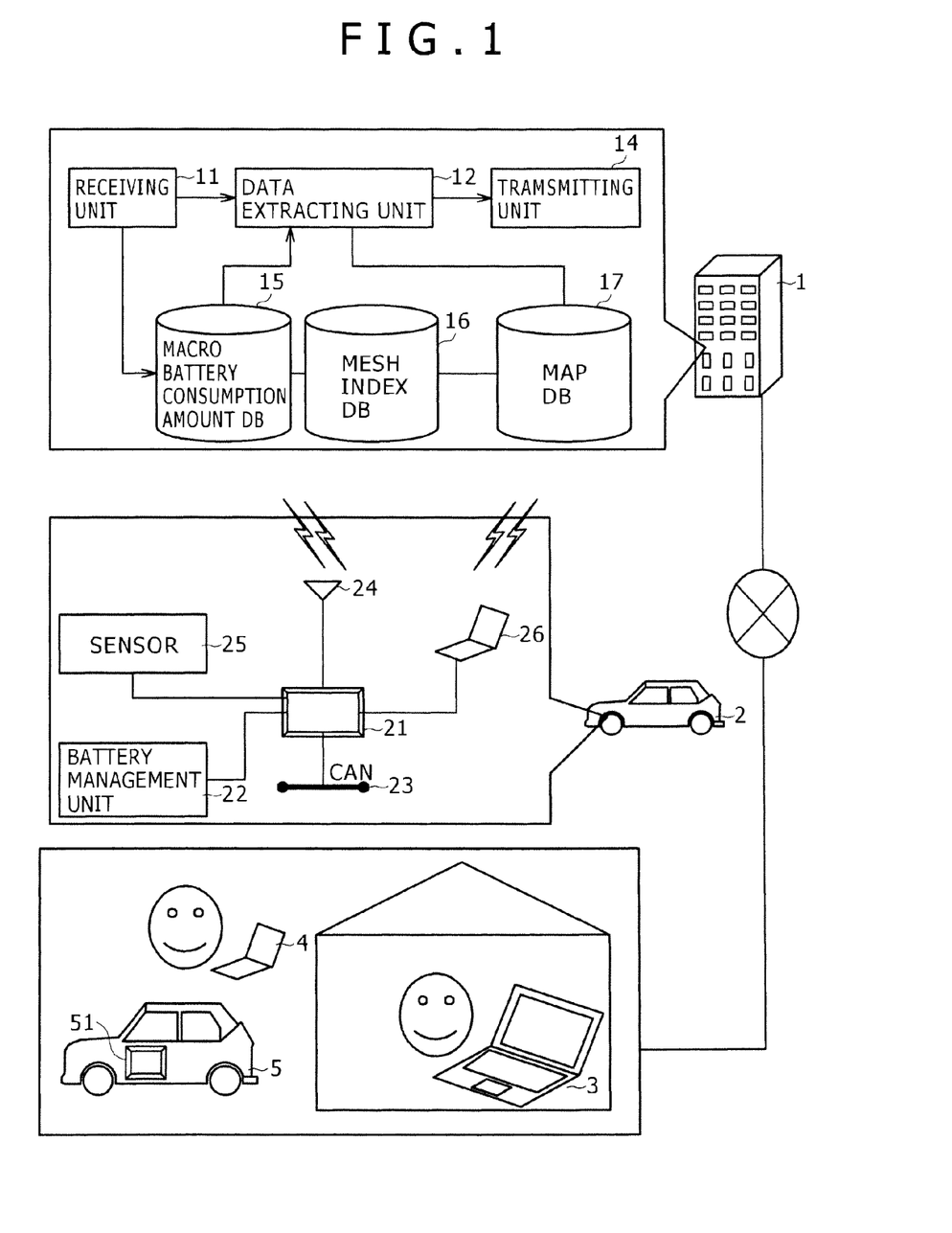
FIG. 1 is a configuration diagram showing an overall power consumption amount transmission/reception system including a route retrieval support center.

A configuration of a power consumption amount transmission/reception system including a route retrieval support center 1 in a first embodiment of the present invention is illustrated in FIG. 1. The power consumption amount transmission/reception system illustrated in FIG. 1 includes a probe vehicle (electric vehicle) 2 which transmits the amount of power consumed when running, via a communication terminal, the route retrieval support center 1 which stores the power consumption amount of the probe vehicle 2 and extracts any power consumption amount, and delivers extracted thereof to a terminal device, and the terminal device such as a personal computer 3 which displays the power consumption amount delivered from the route retrieval support center 1, a cellular phone 4, or a navigation device 51 with a communication function, which is mounted to an electric vehicle 5, or the like.

The probe vehicle 2 has a navigation device 21, a battery management unit 22, a CAN (Controller Area Network) 23, a GPS antenna 24, a sensor 35 and a communication terminal 26. The navigation device 21 mounted to the probe vehicle 2 regularly collects or acquires battery's remaining charge amount data or power consumption amount data from the CAN 23 being an inter-electronic device network in the battery management unit 22 or the probe vehicle 2. The navigation device 21 transmits the acquired data to the route retrieval support center 1 through the use of the communication terminal 26 together with the present location and time of the probe vehicle 2 both measured based on the data input from the GPS antenna 24 or the sensor 25 such as a gyro. A transmission period in this case may be set every at acquisition, predetermined time, mesh to be described in FIG. 2 or time of arrival at a destination.

The route retrieval support center 1 includes a receiving unit 11, a data extracting unit 12, a transmitting unit 14, a macro battery consumption amount DB 15, a mesh index DB 16, and a map DB 17. In the route retrieval support center 1, the receiving unit 11 receives data from the probe vehicle 2. When the probe vehicle 2 reaches a destination, the data extracting unit 12 calculates the total amount of power consumption at the travelling of the probe vehicle 2 from its departure point to the destination. The data extracting unit 12 extracts a mesh ID for a mesh (each of sections obtained by dividing the map in grid form) including a departure point of the probe vehicle 2, and a mesh ID for a mesh including a destination thereof. The thus-extracted mesh IDs are applied to the calculated amount of power consumption and stores the result of application in the macro battery consumption amount DB 15. The macro battery consumption amount DB 15 has a plurality of seasonally categorized folders. The calculated amount of power consumption may be stored in the folder of the corresponding season at the time of the travelling of the probe vehicle 2.

The receiving unit 11 of the route retrieval support center 1 receives a request message including the departure point of the electric vehicle 5, the destination of the electric vehicle 5, the battery remaining amount of the electric vehicle 5, and a transmission request for a power consumption amount necessary for the electric vehicle 5 to travel from its departure point to its destination from the terminal device such as the personal computer 3, the cellular phone 4 or the navigation device 51 of the electric vehicle 5, or the like. When the receiving unit 11 receives the request message therein, the data extracting unit 12 performs a search for a route that connects the departure point and the destination by referring to the map DB 17. The data extracting unit 12 extracts a plurality of mesh IDs respectively associated with a plurality of meshes lying within a rectangular predetermine area including the departure point, the destination and the route obtained by the search from the mesh index DB 16. The data extracting unit 12 extracts the power consumption amount stored in the macro battery consumption amount DB 15 as a result of travelling of the probe vehicle 2 in the past between two meshes associated with two mesh IDs, included in the plurality of meshes corresponding to the extracted mesh IDs from the macro battery consumption amount DB 15. The data extracting unit 12 extracts the thus-extracted power consumption amount as a power consumption amount necessary for the electric vehicle 5 to travel from the departure point to the destination. The transmitting unit 14 transmits information on the power consumption amount necessary for the traveling of the electric vehicle 5, which has been extracted by the data extracting unit 12, and/or information including incidental information to be described later, i.e., information related to a power consumption amount to the terminal device such as the personal computer 3, the cellular phone 4 or the navigation device 51 of the electric vehicle 5, or the like.

Based on the power consumption amount extracted by the data extracting unit 12 and the battery remaining amount of the electric vehicle 5, which is included in the request message received by the receiving unit 11, the transmitting unit 14 may transmit incidental information including a notice indicating that the electric vehicle 5 is able to reach its destination without charging in the course of its travelling. The transmitting unit 14 may alternatively transmit incidental information including a notice indicating that the electric vehicle 5 is unable to reach its destination without charging in the course of its travelling and/or the amount of charge necessary for the electric vehicle 5 to reach its destination, to the terminal device.

Information as to whether the electric vehicle 5 is able to reach the destination without charging in the course of its travelling is displayed on the screen of the terminal device such as the personal computer 3, the cellular phone 4, based on information related to the power consumption amount transmitted by the transmitting unit 14 of the route retrieval support center 1. When the electric vehicle 5 is able to reach the destination without charging in the course of its travelling, there are displayed, for example, information on the amount of power consumption necessary for the travelling of the electric vehicle 5, which has been extracted by the data extracting unit 12 of the route retrieval support center 1, and a message indicating that the electric vehicle 5 is able of reaching the destination. When the electric vehicle 5 is not able to reach the destination without charging in the course of its travelling, there are displayed, for example, information on the charge amount necessary for the electric vehicle 5 to reach the destination, and a message indicating that the electric vehicle 5 is not able to reach the destination.

Data formats for data respectively stored in the macro battery consumption amount DB 15 of the route retrieval support center 1 and the mesh index DB 16 thereof will next be described referring to FIGS. 2A through 2C.

Figure 2A:
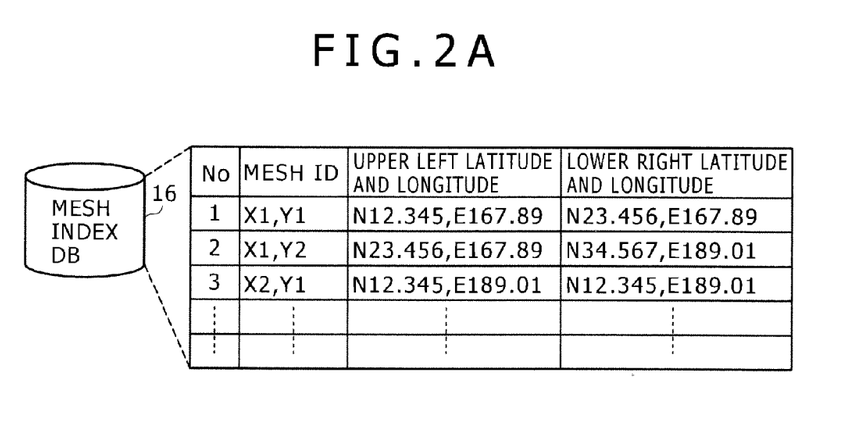
FIGS. 2A through 2C are diagrams illustrating data formats for data stored in the route retrieval support center.

FIG. 2A shows the data format for the data stored in the mesh index DB 16. Here, mesh data in which the latitudes and longitudes of upper left points of respective meshes and the latitudes and longitudes of lower right points thereof are associated with mesh IDs of the respective meshes, are stored in order from the northwestern meshes to the southeastern meshes, which divide a map stored in the map DB 17.

Figure 2B:
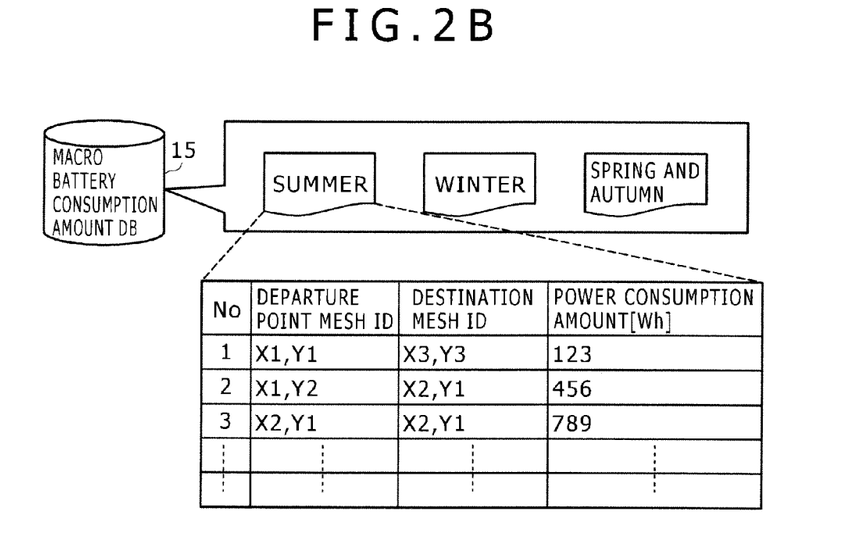
Figure 2C:
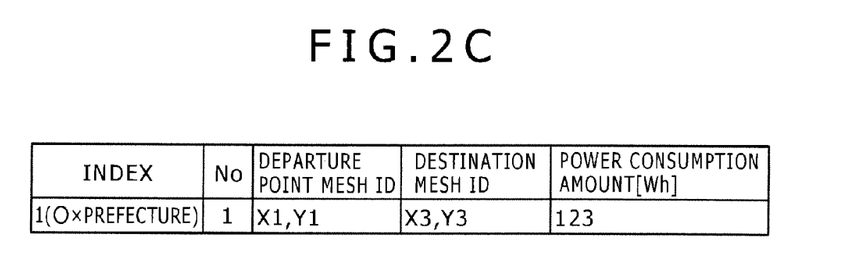

FIGS. 2B and 2C are formats of the macro battery consumption amount DB 15. As shown in FIG. 2B, the past actual values of power consumption amounts acquired from the probe vehicle 2 are stored in advance in the macro battery consumption amount DB 15. The stored past actual values of power consumption amounts are associated with the mesh ID of the departure point mesh including the departure point of the probe vehicle 2 and the mesh ID of the destination mesh including its destination. Thus, a plurality of power consumption amounts acquired as a result of travelling between two points corresponding to departure points and destinations of a plurality of probe vehicles 2 are respectively associated with a plurality of combinations of respective two meshes corresponding to departure-point meshes and destination meshes in the macro battery consumption amount DB 15 and respectively stored therein in advance as power consumption amounts required for travelling between the two meshes.

Since the power consumption amounts differ from each other due to the presence or absence of usage of an air conditioner dependent on the temperature in the car interior even where the probe vehicle runs between the same meshes, data have been seasonally categorized and stored in the macro battery consumption amount DB 15 as shown in FIG. 2B. Although the data are categorized into three temporal sections of being, for example, the summer that uses cooling, the winter that uses heating, and the spring and autumn that do not use either of them, the type of temporary section is not limited to the three. Since the amount of power consumption depends even on the performance of a battery, and the battery performance is affected by the temperature of the battery, for example, the month may be used as a temporary section affected by the temperature of the battery. Since the temperature of the battery changes according to the average temperature of the month, the amount of power consumption changes monthly.

As shown in FIG. 2C, a prefecture number or the like may be applied to the data stored in the macro battery consumption amount DB 15 as an index. Although it takes time to perform retrieval when the stored data increases, categorization of data on a prefectural basis makes it possible to perform such retrieval as to narrow down the range to within a prefecture to which the departure point belongs and within a prefecture to which the destination belongs.

A flow for a process of the route retrieval support center 1, by which a similar route is extracted, and the estimated value of a power consumption amount and information as to whether a destination is attainable are transmitted to the navigation device 51 of the electric vehicle 5 will next be described referring to FIG. 3. At Step S31, the receiving unit 11 receives the present location (departure point) of the electric vehicle 5 and its destination, and the battery remaining amount of the electric vehicle 51 from the navigation device 51 of the electric vehicle 5. At Step S32, the data extracting unit 12 searches for a route to the shortest time or the shortest distance from the present location to the destination.

At Step S33, the data extracting unit 12 determines a rectangular predetermined area including the present location and the destination received from the receiving unit 11, and the route retrieved at Step S32. And then the data extracting unit 12 extracts a mesh ID for an upper left mesh and a mesh ID for a lower right mesh both lying within the rectangular predetermined area. If a combination associated with the amount of power consumption and stored in the macro battery consumption amount DB 15 exists within a plurality of combinations of departure point mesh and destination mesh included within the rectangular predetermined area at Step S34, then the data extracting unit 12 extracts from the macro battery consumption amount DB 15, a power consumption amount corresponding to the combination, which is required for the electric vehicle 5 to move between the two meshes, as the estimated value of the amount of power consumption necessary for the electric vehicle 5 to travel from the present location to the destination.

When it is found at Step S35 that the data stored in the macro battery consumption amount DB 15 do not correspond to any of the above combinations and that the data extracting unit 12 is not able to extract the amount of power consumption, the transmitting unit 14 notifies an inability to transmit the estimated value of the power consumption amount to the electric vehicle 5 at Step S36.

When it is found at Step S35 that the data of the power consumption amount corresponding to any of the above combinations exits in the data stored in the macro battery consumption amount DB 15, the data extracting unit 12 extracts a power consumption amount $\alpha$. At Step S37, the data extracting unit 12 compares the extracted power consumption amount $\alpha$ and the battery remaining amount $\beta$ of the electric vehicle 5 received by the receiving unit 11 at Step S31. When the extracting unit 12 determines at Step S38 that the power consumption amount $\alpha$ is smaller than or equal to the battery remaining amount $\beta$, the transmitting unit 14 transmits incidental information including a notice indicating that the electric vehicle 5 is able to reach its destination without charging in the course of its travelling, and information on the estimated value (power consumption amount $\alpha$) of the power consumption amount to the navigation device 51 of the electric vehicle 5 at Step S39.

When the data extracting unit 12 determines at Step S38 that the power consumption amount $\alpha$ is larger than the battery residual amount $\beta$, the transmitting unit 14 transmits incidental information including a notice indicating that the electric vehicle 5 is not able to reach its destination without charging in the course of its travelling, and a battery charge amount necessary for the electric vehicle 5 to reach the destination, to the navigation device 51 of the electric vehicle 5 at Step S40.

An example of a process for determining the rectangular predetermined area, which is performed at Step S33 of FIG. 3 will next be described referring to FIGS. 4A and 4B. FIG. 4A shows an example of a traveling route taken for the electric vehicle 5 to depart from a mesh (X1, Y1) to reach a mesh (X3, Y3). The above rectangular predetermined area is determined as a rectangular area including the present location and destination of the electric vehicle 5 and the route from the present location to the destination. In the example shown in FIG. 4A, the rectangular predetermined area is determined as a rectangular area 410 from the upper left mesh (X1, Y1) to the lower right mesh (X3, Y3).

Figure 4A:
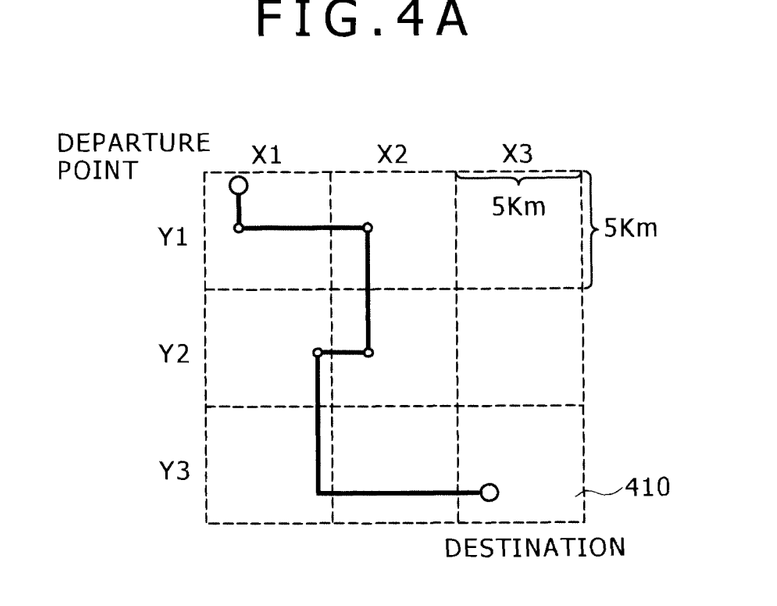
FIGS. 4A and 4B are diagrams illustrating an example of a process for determining a rectangular predetermined area.
Figure 4B:
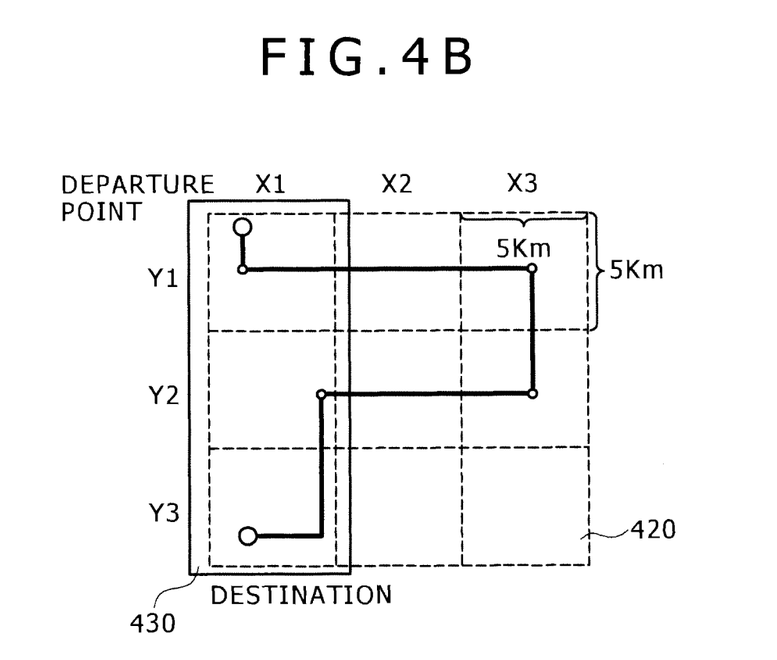

In an example shown in FIG. 4B, the above rectangular predetermined area is determined not to be as a rectangular area 430 from an upper left mesh (X1, Y1) to a lower left mesh (X1, Y3) surrounded by a rectangle indicated by a solid line, but as a rectangular area 420 from an upper left mesh (X1, Y1) to a lower right mesh (X3, Y3) in a manner similar to FIG. 4A.

Incidentally, although the size of one mesh is a range of 5 km as an example in FIGS. 4A and 4B, it is not limited to this size. The shape of one mesh may not be set as square. For example, a rectangle may be adopted.

Figure 5A:
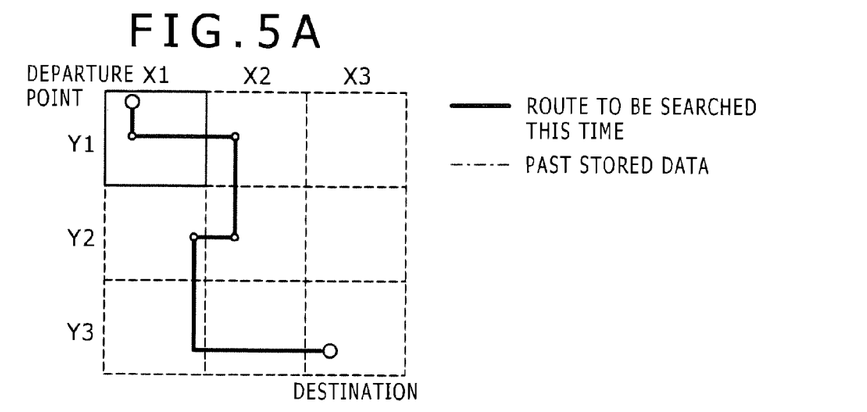
FIGS. 5A through 5D are diagrams illustrating an example of combinations of departure point meshes and destination meshes associated with power consumption amounts extracted from a macro battery consumption amount DB.
Figure 5B:
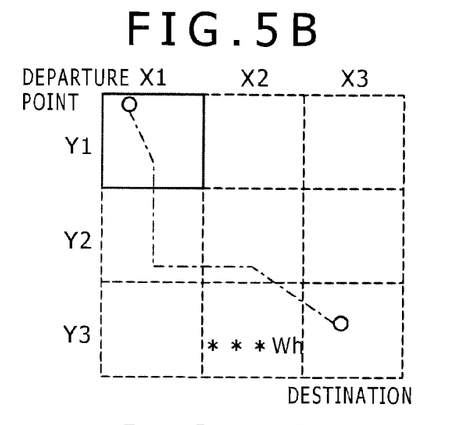
Figure 5C:
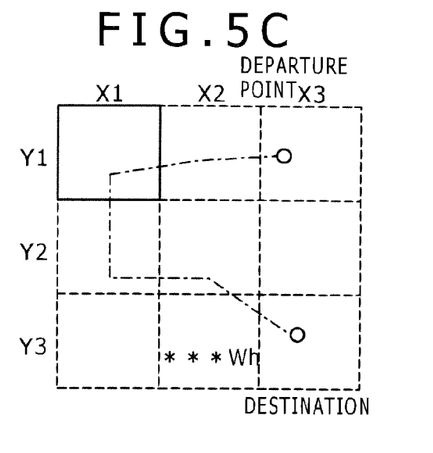
Figure 5D:
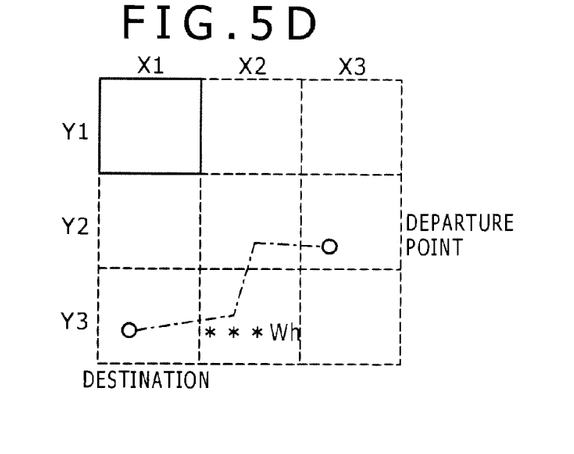

Several examples illustrative of combinations of departure point mesh and destination mesh associated with the power consumption amount extracted from the macro battery consumption amount DB 15 at Step S34 of FIG. 3 will be described here referring to FIGS. 5A through 5D. FIG. 5A shows a route from the present location of the electric vehicle 5 to the destination thereof, which has been searched by the route retrieval support center 1 at Step S32 in response to the request from the navigation device 51 of the electric vehicle 5. FIGS. 5B through 5D respectively show routes corresponding to the past actual values stored in the macro battery consumption amount DB 15 in the route retrieval support center 1.

When the departure point mesh and the destination mesh are both identical to the departure point mesh and the destination mesh for the route shown in FIG. 5A as shown in FIG. 5B, the power consumption amount associated with the combination of the departure point mesh and the destination mesh for the route shown in FIG. 5B is subjected to extraction by the data extracting unit 12 at Step S34. Even when the departure point mesh is different from the departure point mesh for the route shown in FIG. 5A as shown in FIG. 5C, the power consumption amount in this case is extracted by the data extracting unit 12 at Step S34. Even when the departure point mesh and the destination mesh are both different from the departure point mesh and the destination mesh for the route shown in FIG. 5A as shown in FIG. 5D, the power consumption amount in this case is extracted by the data extracting unit 12 at Step S34. Even in the case of a route different from the route shown in FIG. 5A, although belonging to the same departure point mesh and destination mesh as those for the route shown in FIG. 5A, the route being obviously different from the route shown in FIG. 5A in terms of the distance between the departure point mesh and the destination mesh, the power consumption amount in this case is extracted by the data extracting unit 12 at Step S34.

This is for the purpose of providing, to the terminal device, a rough value serving as a constant guide taken as an estimated value of a power consumption amount required for the electric vehicle 5 to travel from the present location to the destination even if the data acquired from the probe vehicle 2 and stored in the macro battery consumption amount DB 15 are few in number.

When the details of the route corresponding to the power consumption amount extracted by the data extracting unit 12 at Step S34 are stored in the macro battery consumption amount DB 15, the degree of similarity between the stored route and the route searched by the data extracting unit 12 at Step S32 is calculated by the known pattern matching. When the degree of similarity therebetween is low, the power consumption amount extracted at Step S34 may not be provided to the terminal device.

When data of a plurality of sets of power consumption amounts corresponding to a plurality of pairs of the above plural combinations exist in the data stored in the macro battery consumption amount DB 15, data of any one set of power consumption amount may be extracted in accordance with a criterion of judgment as to the latest data, data maximum in power consumption amount or data minimum in power consumption amount or the like.

Figure 6A:
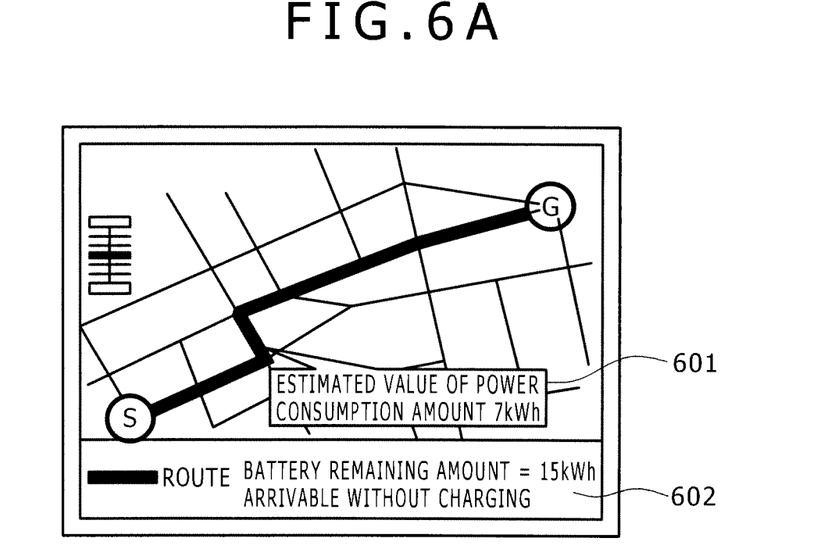
FIGS. 6A and 6B are diagrams showing screen display examples of a terminal device.
Figure 6B:
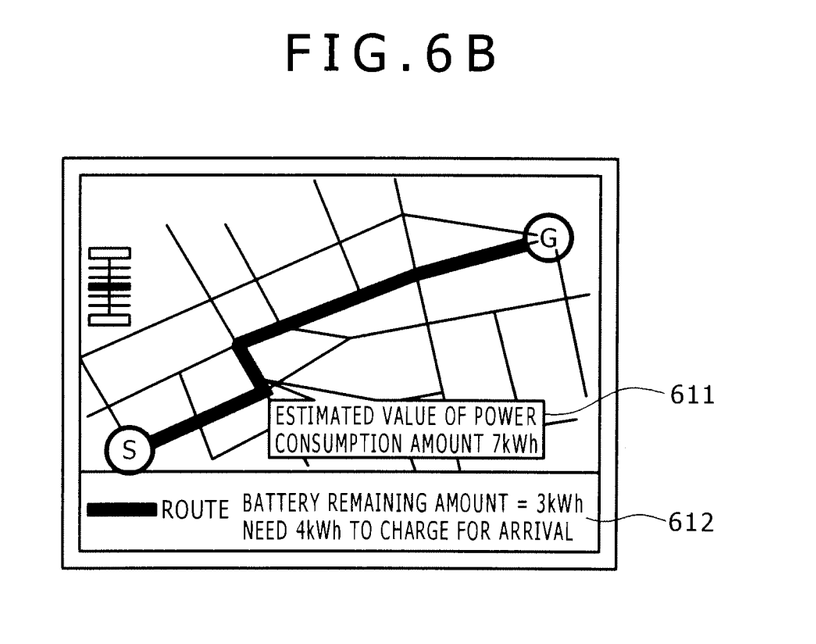

An example illustrative of display screens of the terminal device will be described referring to FIGS. 6A and 6B. Based on information related to the power consumption amounts transmitted from the transmitting unit 14 of the route retrieval support center 1 at Steps S39 and S40 of FIG. 3, information as to whether the electric vehicle 5 is able to reach the destination without charging in the course of its travelling is displayed on the screen of the terminal device. In FIG. 6A, information 601 about the amount of power consumption required for the electric vehicle 5 to travel from the departure point to the destination, and a message 602 indicative of the electric vehicle 5 being able to reach the destination are displayed on the screen of the terminal device, based on information related to the power consumption amount transmitted from the transmitting unit 14 of the route retrieval support center 1 at Step S39. In FIG. 6B, information 611 about the amount of power consumption necessary for the electric vehicle 5 to travel from the departure point to the destination, and a message 612 indicative of information on the charge amount necessary for the electric vehicle 5 to arrive are displayed on the screen of the terminal device, based on information related to the power consumption amount transmitted from the transmitting unit 14 of the route retrieval support center 1 at Step S40.

The screens shown in FIGS. 6A and 6B may be displayed as the screen of the personal computer 3 for home use prior to the departure of the electric vehicle 5, and the screen of the cellular phone 4 when outside even other than the screen of the navigation device 51 of the electric vehicle 5.

The transmitting unit 14 of the route retrieval support center 1 may transmit various incidental information in such a manner that a distribution of meshes associated with data about the amounts of power stored in the macro battery consumption amount DB (15) and consumed when the probe vehicle 2 ran in the past is displayed on the screen of the terminal device having received the various incidental information throughout Japan and a map in a predetermined range such as Tokyo's 23 wards.

Consequently, a user grasps the estimated values of battery power consumption amounts at the time that the electric vehicle 5 runs in various regions and is able to recognize a region where the user is able to drive at ease. An operator of the route retrieval support center 1, which has referred to the above mesh distribution, grasps data-free regions and thereby runs the probe vehicle possessed by the operator to store data in afresh, thereby making it possible to improve the coverage ratio of data.

Further, the transmitting unit 14 of the route retrieval support center 1 transmits incidental information including information on trajectories along which the probe vehicle ran in the past, whereby the incidental information may be displayed on the screen of the terminal device having received them. The meshes are displayed in color-coding form according to the magnitude of the amount of power consumption, so that the user is able to select a route low in power consumption. If each mesh low in power consumption amount is taken as green and meshes are changed to the yellowish green, yellow, orange and red as the power consumption amount increases, the user is able to select a route that goes through a lot of green meshes as a route low in power consumption.

The route retrieval support center 1 in the first embodiment is configured so as to provide the rough estimated value of the power consumption amount required for the electric vehicle 5 to travel from the current location to the destination to the terminal device. Therefore, the route retrieval support center 1 is suitably used where the minimization of processing time is given priority and the data stored in the macro battery consumption amount DB 15 is small in number.

<Second Embodiment>

In a route retrieval support center 1 in a second embodiment of the present invention, data stored in a macro battery consumption amount DB 15 increases, and suitable processing is performed where it is necessary to take into consideration both the shortening of processing time and an improvement in the accuracy of the estimation of a power consumption amount uniformly. A configuration of a power consumption amount transmission/reception system including the route retrieval support center 1 in the second embodiment is illustrated in FIG. 1 as with the first embodiment. The data format for data stored in a mesh index DB 16 is also represented as shown in FIG. 2A as with the first embodiment.

Figure 7A:
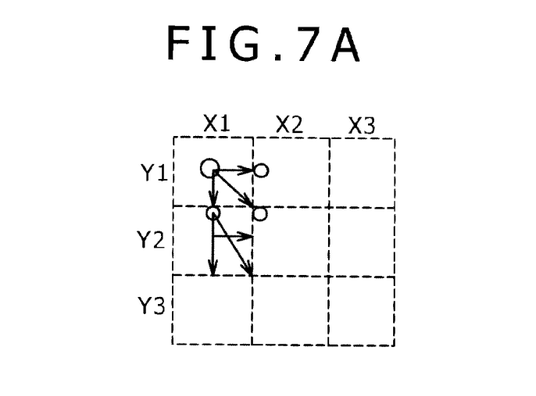
FIGS. 7A through 7C are diagrams showing data formats of a macro battery consumption amount DB 15.
Figure 7B:
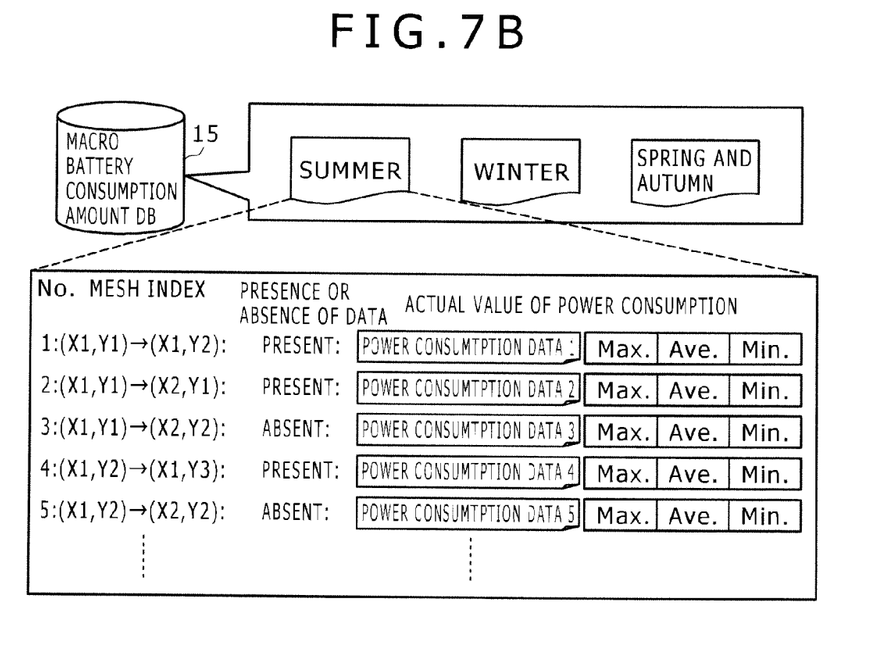
Figure 7C:
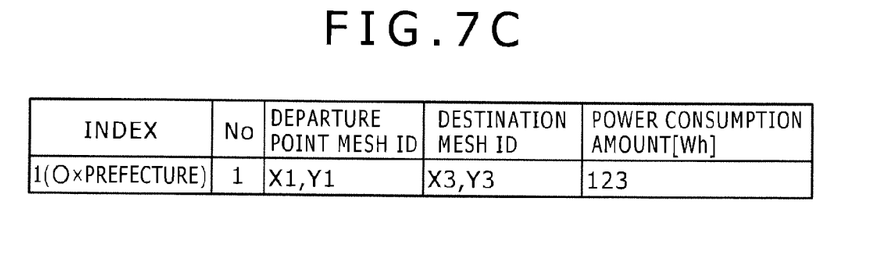

FIGS. 7A through 7C show the formats of the macro battery consumption amount DB 15 in the present embodiment. As shown in FIG. 7A, the past power consumption amounts acquired from a probe vehicle 2 are stored in the macro battery consumption amount DB 15. In the route retrieval support center 1, a receiving unit 11 receives data from the probe vehicle 2. The amounts of power consumption required for the probe vehicle 2 to travel from a given mesh to adjacent meshes are associated with a mesh ID of a source mesh and mesh IDs of destination adjacent meshes and sequentially stored in advance in order from the northwesternmost meshes to the southeasternmost meshes in the macro battery consumption amount DB 15. There are set as shown in FIG. 7A, flags each indicative of whether data of a power consumption amount required for travelling between mutually adjacent two meshes for the source and destination exists.

When the data of the power consumption amount required for the travelling between the two meshes adjacent to each other exist in the form of plural sets, the maximum value (Max.) of the power consumption amount, the average value (Ave.) thereof, and the minimum value (Min.) thereof are stored. Upon the after-mentioned estimation of a power consumption amount necessary for an electric vehicle 5 to travel from the present location to its destination, any of the maximum value (Max.) of the power consumption amount, the average value (Ave.) thereof, and the minimum value (Min.) thereof can be used in choice form.

As shown in FIG. 7C, the data stored in the macro battery consumption amount DB 15 may be assigned a prefecture number or the like as an index as with the first embodiment. Although it takes time to perform retrieval when the stored data increases, categorization of data on a prefectural basis makes it possible to perform such retrieval as to narrow down the range to within a prefecture to which a departure point belongs and within a prefecture to which a destination belongs.

Figure 8:
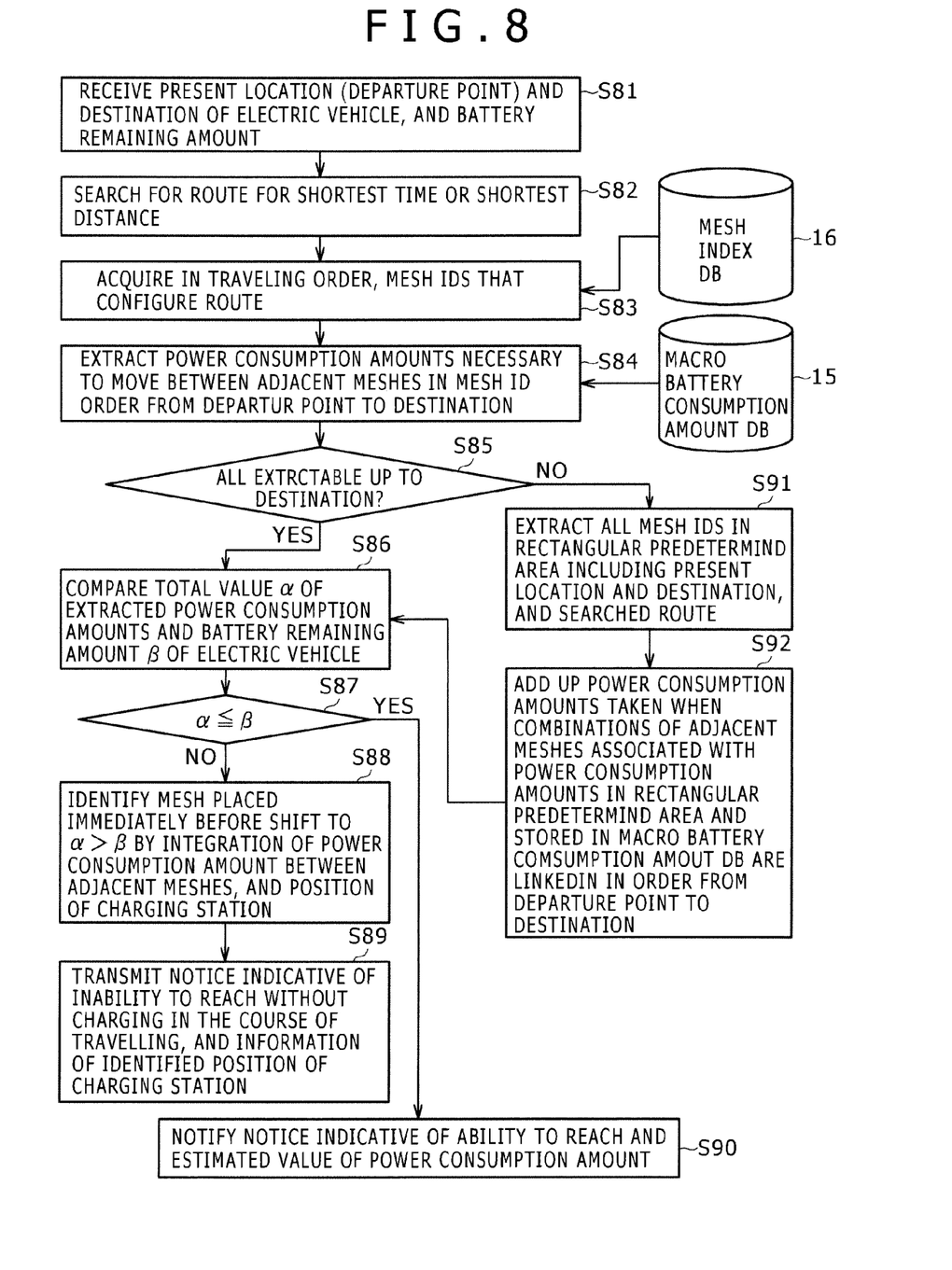
FIG. 8 is a flowchart of a process by which a similar route is extracted, and information on the estimated value of a power consumption amount and information as to whether a destination is attainable are transmitted.

A flow for a process of the route retrieval support center 1 by which a similar route is extracted, and the estimated value of a power consumption amount, information as to whether a destination is achievable, and incidental information including a route extending up to a charging station where the electric vehicle 5 is not able to reach the destination without charging in the course of its travelling are transmitted to a navigation device 51 of the electric vehicle 5 will next be described referring to FIG. 8.

Figure 3:
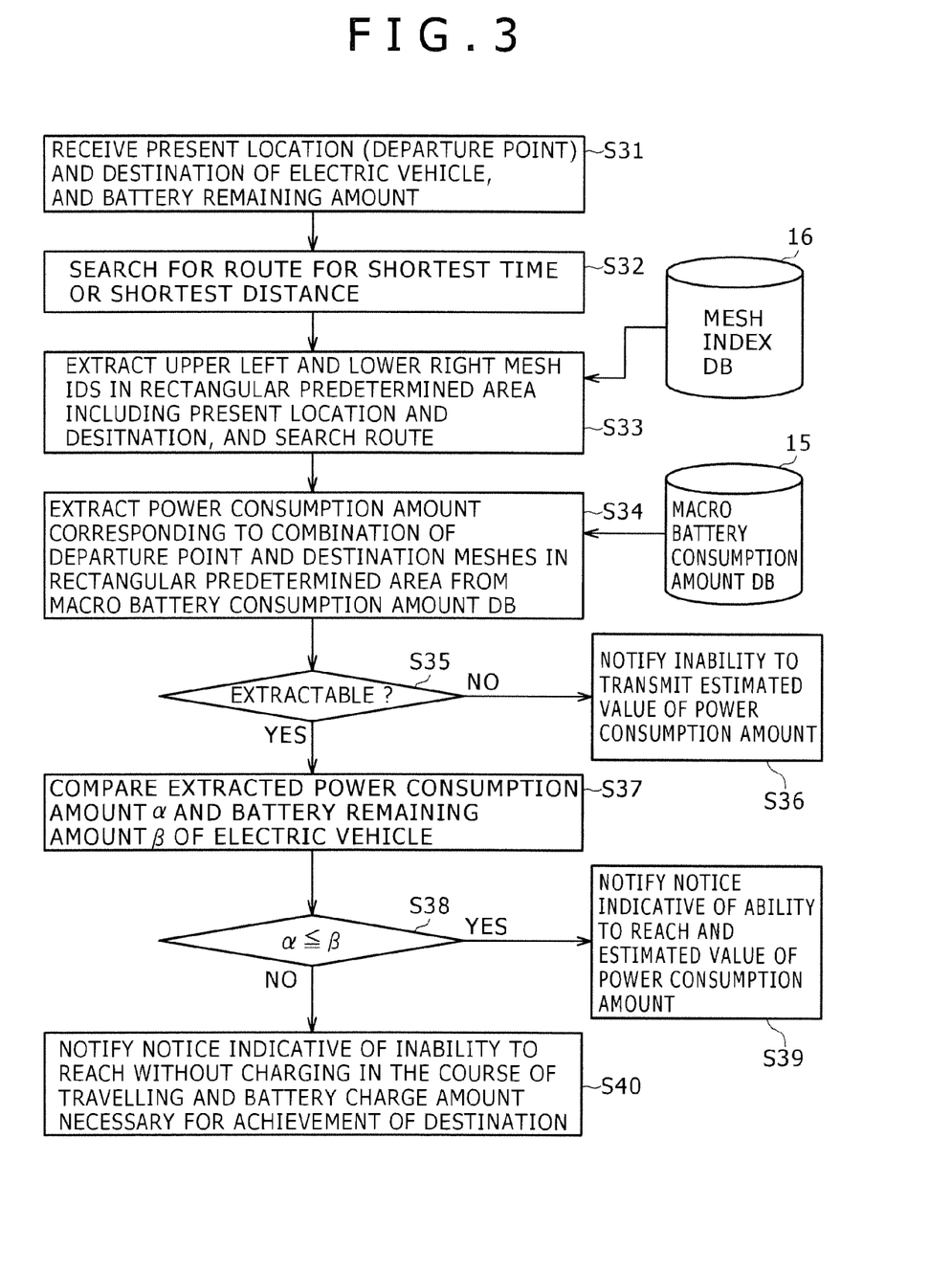
FIG. 3 is a flowchart of a process by which a similar route is extracted, and the estimated value of a power consumption amount and information as to whether a destination is attainable are transmitted to a navigation device of an electric vehicle.

At Steps S81 and S82, processes similar to Steps S31 and S32 of FIG. 3 are respectively performed.

At Step S83, a data extracting unit 12 acquires from a mesh index DB 16, mesh IDs for a plurality of meshes that configure a route searched at Step S82 in the order in which the electric vehicle runs from a departure point to a destination.

At Step S84, the data extracting unit 12 extracts from the macro battery consumption amount DB 15, power consumption amounts required for the electric vehicle 5 to move to adjacent meshes in the order of the mesh IDs acquired at Step S83 between the departure point of the route searched at Step S82 and its destination.

When the data extracting unit 12 determines at Step 85 that data of the same mesh IDs as the mesh IDs of all the meshes that configure the route searched at Step S82 have all been stored in the macro battery consumption amount DB 15, the data extracting unit 12 compares the total value α of power consumption amounts extracted at Step S84 or Step S92 to be described later, and the battery residual amount β of the electric vehicle 5 received by the receiving unit 11 at Step S81. If the data extracting unit 12 determines at Step S87 that the power consumption amount α is smaller than or equal to the battery remaining amount β as the result of comparison at Step S86, a transmitting unit 14 transmits at Step S90, incidental information including a notice indicating that the electric vehicle 5 is able to reach its destination without charging in the course of its travelling, and information on the estimated value (power consumption amount α) of the power consumption amount to the navigation device 51 of the electric vehicle 5.

If the data extracting unit 12 determines at Step S87 that the power consumption amount α is larger than the battery remaining amount β as the result of comparison at Step S86, the transmitting unit 14 transmits a notice indicating that the electric vehicle 5 is not able to reach its destination without charging in the course of its travelling, and incidental information including the amount of charge necessary for the electric vehicle 5 to reach the destination to the navigation device 51 of the electric vehicle 5 at Step S89 after Step S88 to be described later.

At Step S88, the data extracting unit 12 adds up or integrates power consumption amounts required to move to the adjacent meshes in order of the mesh IDs acquired at Step S83 from the departure point of the route searched at Step S82 to its destination. The power consumption amount α obtained as an integrated value may be placed in a relationship of being smaller than or equal to the battery remaining amount β at the beginning of the integration, but is shifted to a relationship of being larger than the battery remaining amount β by integration. The data extracting unit 12 identifies a mesh ID placed immediately before the relation between their magnitudes is reversed by integration in this way, and identifies the location of a charging station placed in the identified mesh by referring to a map DB 17. At Step S89, the transmitting unit 14 transmits information on the position of the charging station identified by the data extracting unit 12 at Step S88 to the navigation device 51 of the electric vehicle 5 inclusive of the above incidental information.

At Step S85, the data of the same mesh IDs as the mesh IDs for all the meshes that configure the route searched at Step S82 are not necessarily arranged in the macro battery consumption amount DB 15. In such a case, the data extracting unit 12 refers to the mesh index DB 16 at Step S91 and thereby determines a rectangular predetermined area including the present location and destination acquired by the receiving unit 11 at Step S81 and the route searched at Step S82 and extracts all mesh IDs for all meshes in the rectangular predetermined area.

When the combinations of the mutually adjacent two meshes associated with the power consumption amounts and stored in the macro battery consumption amount DB 15 can be linked in order between the departure point and the destination with the rectangular predetermined area, the data extracting unit 12 adds up at Step S92, the power consumption amounts associated with the linked combinations of meshes and extracts the added-up result as a total value α of power consumption required for the electric vehicle 5 to travel from the departure point to the destination. Thereafter, the process proceeds to Step S86.

When the combinations of the mutually adjacent two meshes associated with the power consumption amounts and stored in the macro battery consumption amount DB 15 cannot be linked completely from the departure point to the destination within the rectangular predetermined area at Step S92, the total value α of power consumption required for the electric vehicle 5 to travel from the departure point to the destination is extracted in accordance with the following three methods (1) through (3), for example.

(1) Power consumption amounts taken till when the combinations of mutually adjacent two meshes associated with power consumption amounts and stored in the macro battery consumption amount DB 15 could be linked in order from a departure point within the rectangular predetermined area, are added up. That is, the combined or summed value of power consumption amounts corresponding to the travelling from a departure point mesh MS to the last mesh ML linked thereto is calculated. The combined value is extracted as the total value α of the power consumption required for the electric vehicle 5 to travel from the departure point to the destination.

(2) A value obtained by multiplying the summed value calculated in the above paragraph (1) by a coefficient corresponding to the ratio between the number (i.e., the number of meshes) of mesh IDs acquired at Step S83 and belonging to the route from the departure point to the destination and the number of meshes linked from the departure point mesh MS to the mesh ML is extracted as the total value α of power consumption necessary for the electric vehicle 5 to travel from the departure point to the destination.

(3) As in the first embodiment, a power consumption amount necessary for the travelling between any two points in the rectangular predetermined area is extracted as the total value α of power consumption necessary for the electric vehicle 5 to travel from the departure point to the destination.

The screen of the terminal device on which information as to whether the electric vehicle 5 is able to reach the destination without charging in the course of its travelling is displayed based on information on the power consumption amount transmitted from the transmitting unit 14 of the route retrieval support center 1 in the present embodiment, is displayed like FIG. 6 as with the first embodiment, and its detailed description will therefore be omitted.

Figure 9A:
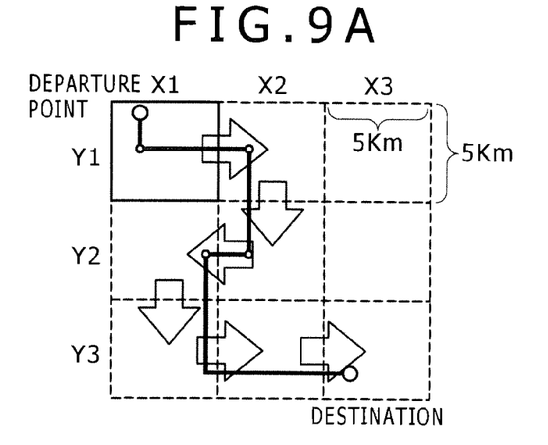
FIGS. 9A through 9C are diagrams illustrating an example in which extracted power consumption amounts are added up.

An example in which the extracted power consumption amounts are added up will be described referring to FIGS. 9A through 9C. FIG. 9A is a diagram for describing an example of the power consumption amounts extracted at Step S84 being added up.

The route from the departure point to the destination, which has been retrieved at Step S82, is indicated by a thick solid line. As the combinations of adjacent meshes prior to and subsequent to the travelling, which configure the route, there are shown six combinations corresponding to a travelling from a mesh (X1, Y1) to a mesh (X2, Y1), a travelling from the mesh (X2, Y1) to a mesh (X2, Y2), a travelling from the mesh (X2, Y2) to a mesh (X1, Y2), a travelling from the mesh (X1, Y2) to a mesh (X1, Y3), a travelling from the mesh (X1, Y3) to a mesh (X2, Y3), and a travelling from the mesh (X2, Y3) to a mesh (X3, Y3) as illustrated in FIG. 9A. The data extracting unit 12 extracts data of the six combinations from the macro battery consumption amount DB 15 and adds up the same.

Figure 9B:
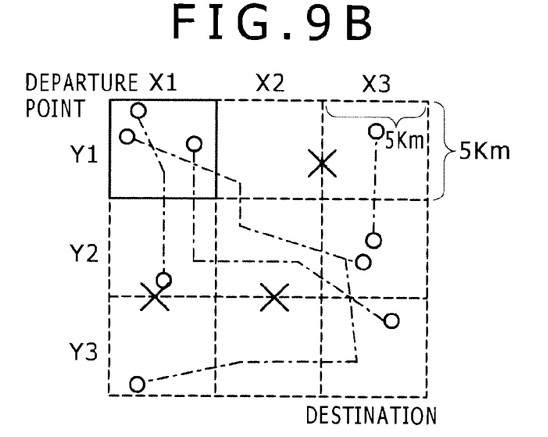
Figure 9C:
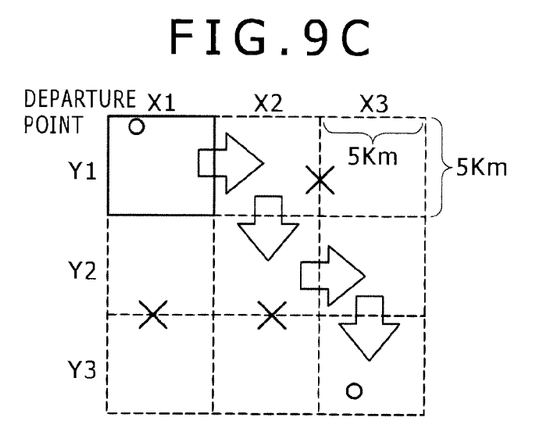

FIGS. 9B and 9C are diagrams for describing, as one example in which the above six types of data are not arranged, an example in which when data corresponding to the travelling from the mesh (X1, Y2) to the mesh (X1, Y3) is not stored in the macro battery consumption amount DB 15, the power consumption amounts extracted at Steps S91 and S92 of FIG. 8 are added up or summed.

FIG. 9B shows with one-dot chain lines, trajectories along which the probe vehicle 2 moved within a rectangular predetermined area including departure points and destinations and searched routes. Actual values of power consumption amounts with the travelling of the probe vehicle 2 between the adjacent meshes are stored in the macro battery consumption amount DB 15 in association with the trajectories indicated by the one-dot chain lines. In this case, it is understood that there are no data indicative of actual values of power consumption amounts with the travelling between the adjacent meshes at three points indicated by x marks in FIG. 9B. Thus, when the data indicative of the actual values of the power consumption amounts taken with the travelling between the adjacent meshes, which have been stored in the macro battery consumption amount DB 15, are linked to each other where the route retrieved at Step S82 is assumed to be the route shown in FIG. 9A, three data corresponding to the travelling from the mesh (X1, Y1) to the mesh (X2, Y1), the travelling from the mesh (X2, Y1) to the mesh (X2, Y2), the travelling from the mesh (X2, Y2) to the mesh (X1, Y2) can be linked. The fourth data corresponding to the travelling from the mesh (X1, Y2) to the mesh (X1, Y3) is not however stored in the macro battery consumption amount DB 15.

Therefore, the data extracting unit 12 extracts four data corresponding to a travelling from the mesh (X1, Y1) to the mesh (X2, Y1), a travelling from the mesh (X2, Y1) to the mesh (X2, Y2), a travelling from the mesh (X2, Y2) to the mesh (X3, Y2) and a travelling from the mesh (X3, Y2) to the mesh (X3, Y3) at Step S92 as shown in FIG. 9B, adds up power consumption amounts corresponding to the four data and thereby extracts a total value α of power consumption.

In this case, the three of the data between the six adjacent meshes corresponding to the route retrieved at Step S82 coincide with the data between the four adjacent meshes extracted to extract the total value α of the power consumption. Information for notifying to the vehicle 2 may be transmitted to the navigation device 51 of the electric vehicle 5 with the degree of coincidence as the accuracy of data, inclusive of information in the above incidental information.

At Step S84 of FIG. 8, the power consumption amounts required for the electric vehicle 5 to move to the adjacent meshes in the order of the mesh IDs acquired at Step S83 from the departure point of the route searched at Step S82 to the destination are extracted from the macro battery consumption amount DB 15 as described above. A road link sequence that configures the route searched at Step S82 has the potential for being different from each road link sequence along which the probe vehicle 2 actually runs upon travelling of the probe vehicle 2 between the adjacent meshes corresponding to the actual values of the power consumption amounts stored in the macro battery consumption amount DB 15. A description will be made of the road link sequence that configures the route searched at Step S82 and the road link sequence along which the probe vehicle 2 ran, referring to FIGS. 10A and 10B.

Figure 10A:
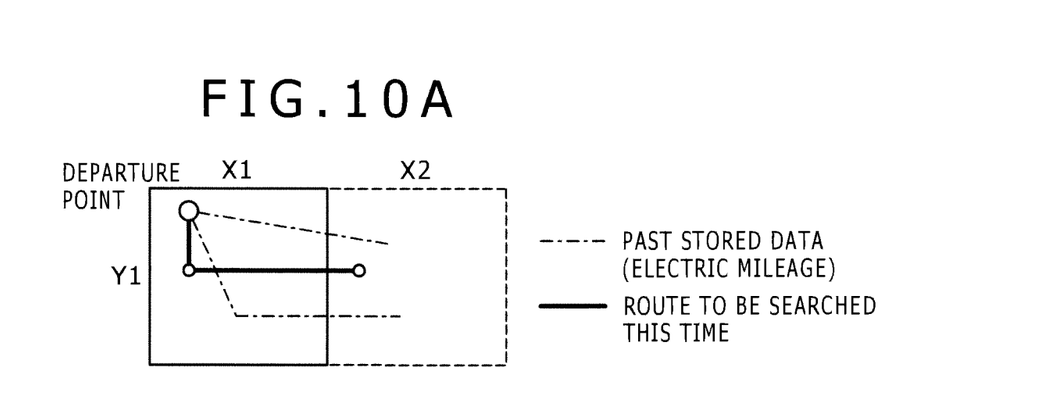
FIGS. 10A and 10B are diagrams showing a road link sequence along which a probe vehicle has run, and a road link sequence which configures a searched route.
Figure 10B:
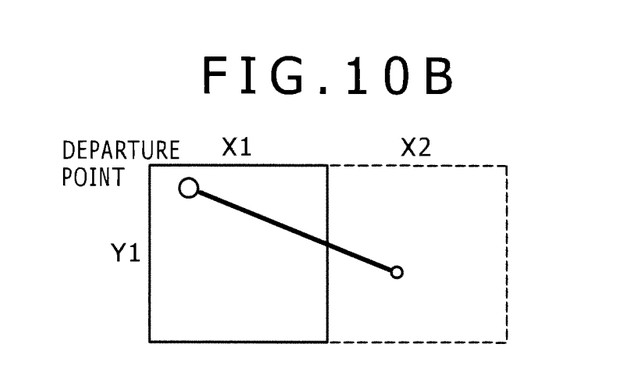

FIG. 10A shows with one-dot chain lines, road link sequences along which the probe vehicle 2 ran and illustrates with a solid line, a road link sequence that configures the route searched at Step S82. Even though a link sequence moved from a mesh for a mesh ID (X1, Y1) to a mesh for a mesh ID (X2, Y1) exists in plural form as shown in FIG. 10A, all are assumed to be the same link sequence as shown in FIG. 10B at Step S84. In the first embodiment, each link sequence along which the probe vehicle 2 ran and each road link sequence that configures the route searched at Step S82 are assumed to be the same link sequence in the overall rectangular predetermined area. Thus, each power consumption amount provided to the navigation device 51 of the electric vehicle by the route retrieval support center 1 in the second embodiment becomes high in accuracy as the distance of the overall route becomes long as compared with the route retrieval support center 1 in the first embodiment.

As with the first embodiment, the route retrieval support center 1 in the second embodiment is configured to provide the rough estimated value of the power consumption amount required for the electric vehicle 5 to travel from the present location to the destination to the terminal device. Therefore, the route retrieval support center 1 is suitably used in the case where the minimization of processing time is assigned priority and the case where the data stored in the macro battery consumption amount DB 15 is few.

Figure 11A:
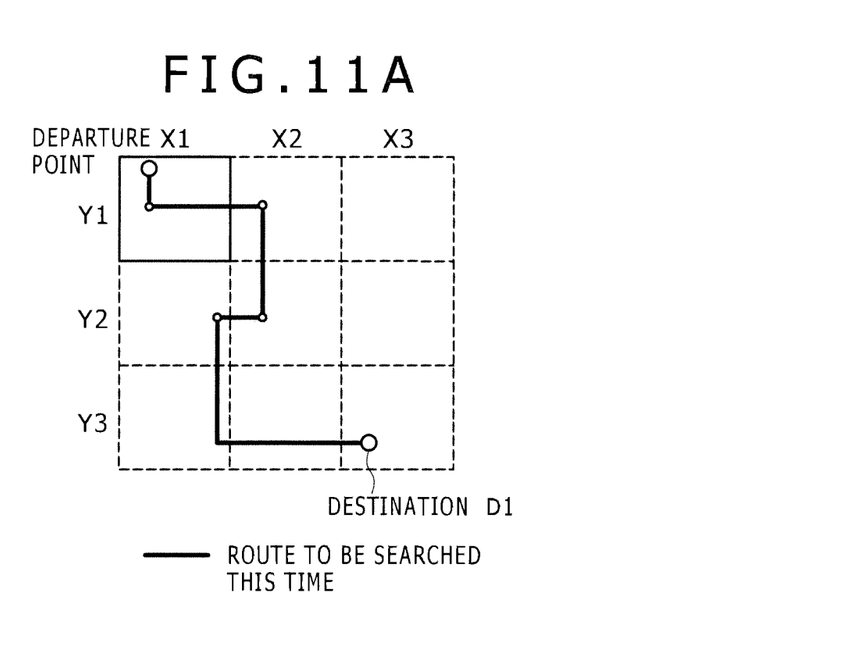
FIGS. 11A and 11B are diagrams illustrating the sum of power consumption amounts where the destination of a probe vehicle and the destination of an electric vehicle are different from each other.
Figure 11B:
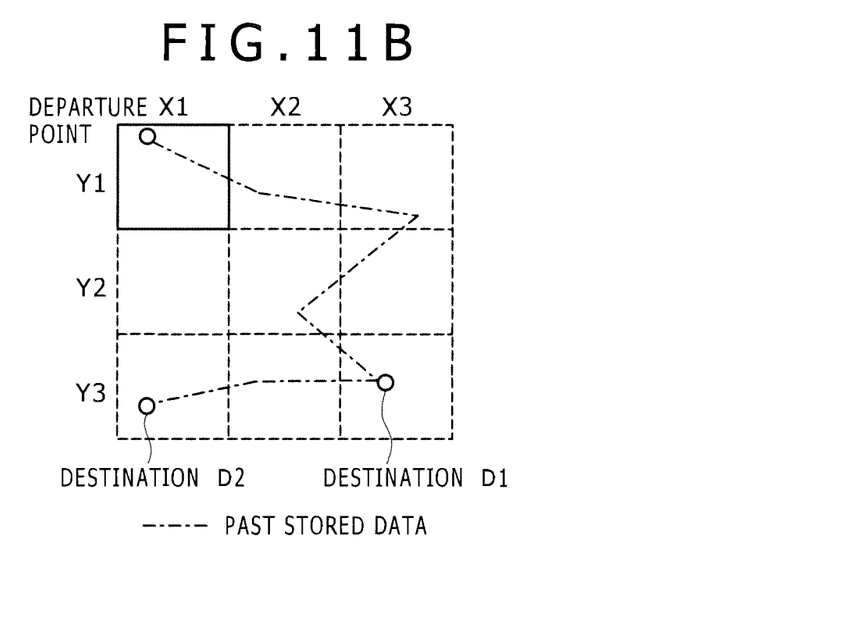

Finally, a description will be made of where power consumption amounts are added up where a destination of the probe vehicle 2 and a destination of the electric vehicle 5 are different from each other, referring to FIGS. 11A and 11. FIG. 11A shows the route of the electric vehicle 5 retrieved at Step S82. FIG. 11B shows trajectories along which the probe vehicle 2 actually ran upon travelling of the probe vehicle 2 between adjacent meshes. As shown in FIGS. 11A and 11B, destinations D1 and D2 of both the electric vehicle 5 and the probe vehicle 2 are different from each other. In the first embodiment, if both destinations are within the same rectangular predetermined area even if they are different from each other, the summed values of the power consumption amounts based on the travelling of the two were assumed to be identical. In the second embodiment, however, the power consumption amounts with the travelling between the adjacent meshes are added up. Therefore, if, when the destination D1 of the electric vehicle 5 is included in the course of the trajectory of the probe vehicle 2 as shown in FIG. 11B, the summed value of power consumption amounts from the departure point to the destination D1 is extracted as the total value α of the power consumption upon adding up the power consumption amounts at Step S92, the accuracy of data increases.

In the second embodiment, the macro battery consumption amount DB categorizes data into three temporal sections of Summer, Winter and Spring and Autumn and stores them as with the first embodiment (refer to FIG. 7A). The type of the temporal section is not however limited to the three, but the macro battery consumption amount DB may include every month, temperature, time zones, or temporal sections of various traveling conditions.

In the above embodiments, vehicles, which need to take into consideration a cruising distance as with the electric vehicle, such as an electric power-assisted bicycle, a plug-in hybrid vehicle, and the like, may be used instead of the electric vehicle 5.

In the above embodiments, the route retrieval support center 1 may set in advance, a predetermined area similar to the above rectangular predetermined area in such a manner that it includes the departure point, destination and travel trajectories of the probe vehicle 2 and store the past departure point and destination of the probe vehicle 2 and its power consumption amount in the past in a predetermined DB along with mesh IDs that configure the predetermined area. At Steps S33 and S34 of FIG. 3, or Steps S83 and S84 of FIG. 8, the data extracting unit 12 identifies the predetermined area similar to the above rectangular predetermined area to thereby make it possible to extract the past departure point and destination of the probe vehicle 2 and its power consumption amount in the past.

What is claimed is:

1. A system for providing information on power consumption amount of an electric vehicle, comprising:

a receiving unit configured to receive a departure point of the electric vehicle and a destination of the electric vehicle from a terminal device;

a database which stores a plurality of power consumption amounts required to move between sections which divide a predetermined area into meshes, wherein each power consumption amount corresponds to a different departure point-destination point combination within the predetermined area;

an extracting unit configured in a computer, the extracting unit configured to retrieve from the database, one of the power consumption amounts based on the departure point and the destination point for the electric vehicle, as the power consumption amount required for the electric vehicle to travel from the departure point to the destination point within the predetermined area; and a transmitting unit configured to transmit information on the power consumption amount extracted by the extracting means to the terminal device.

2. The system according to claim 1, wherein the plurality of power consumption amounts are stored in the database in advance based on results of travelling between two sections by a plurality of respective electric vehicles.

3. The system according to claim 1, wherein the extracting unit is configured to extract, as the power consumption amount required to travel from the departure point to the destination, a power consumption amount required to travel from the first section to the second section from among the plural power consumption amounts.

4. The system according to claim 1, wherein the plurality of combinations of two sections include a combination of a second section including the second point and a third section including a third point in the predetermined area, and wherein the extracting unit is configured to extract a first power consumption amount required to travel from the first section to the second section and a second power consumption amount required to travel from the second section to the third section from among the plural power consumption amounts, and to extract a sum of the first power consumption amount and the second power consumption amount as the power consumption amount required to travel from the departure point to the destination.

5. The system according to claim 1, wherein the plural power consumption amounts are categorized into a plurality of temporal sections affected by the temperature of a battery of the electric vehicle or the temperature in the electric vehicle and stored in the database, and wherein the extracting unit is configured to retrieve from the database, based on the temporary section including times at which the departure point and the destination are received by the receiving means, of the plural temporary sections, thereby extracting the power consumption amount required to travel from the departure point to the destination.

6. The system according to claim 1, wherein the terminal device is configured to display on the screen, information as to whether the electric vehicle is able to reach the destination without charging in the course of its travelling, based on information on the power consumption amount transmitted by the transmitting means.

7. The system according to claim 1, wherein the extracting unit is configured to:

calculate a sum of plural of the power consumption amounts corresponding to a combination of two adjacent sections; and extract the sum as the power consumption amount required for the electric vehicle to travel from the departure point to the destination.

* * * * *